United States Patent
Nessel et al.

(10) Patent No.: US 7,832,064 B2
(45) Date of Patent: Nov. 16, 2010

(54) MULTIPLE ENGAGEMENT JOINT TETHERED FASTENER

(75) Inventors: Rosalind A. Nessel, Birmingham, MI (US); Steven M. Benedetti, Sterling Heights, MI (US); Jeff A. Slobodecki, Wales, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 12/275,671

(22) Filed: Nov. 21, 2008

(65) Prior Publication Data

US 2009/0133233 A1 May 28, 2009

Related U.S. Application Data

(62) Division of application No. 11/656,904, filed on Jan. 23, 2007, now Pat. No. 7,454,826, which is a division of application No. 10/915,028, filed on Aug. 10, 2004, now Pat. No. 7,178,205.

(51) Int. Cl.
*F16B 21/06* (2006.01)
*F16B 5/06* (2006.01)
*F16B 5/12* (2006.01)
*B60R 21/16* (2006.01)

(52) U.S. Cl. .............. 24/297; 24/302; 24/458

(58) Field of Classification Search .......... 24/289, 24/297, 295, 298, 457, 458, 302; 280/728.2
See application file for complete search history.

(56) References Cited

U.S. PATENT DOCUMENTS

| | | | |
|---|---|---|---|
| 1,270,494 A | 6/1918 | Christiansen | |
| 3,508,303 A | 4/1970 | Miyasaka | |
| 4,250,599 A | 2/1981 | Nagashima et al. | |
| 4,398,317 A * | 8/1983 | Schubring | 24/302 |
| 5,038,444 A | 8/1991 | Gordon | |
| 5,150,919 A | 9/1992 | Sakakida et al. | |
| 5,398,960 A | 3/1995 | Ravenberg et al. | |
| 5,403,034 A | 4/1995 | Gans et al. | |
| 5,533,237 A | 7/1996 | Higgins | |
| 5,647,607 A | 7/1997 | Bolieau | |
| 5,651,562 A | 7/1997 | Hagen et al. | |
| 5,791,683 A | 8/1998 | Shibata et al. | |
| 5,813,693 A | 9/1998 | Gordon et al. | |
| 6,053,527 A | 4/2000 | Gans et al. | |
| 6,145,870 A | 11/2000 | Devane et al. | |
| 6,381,811 B2 | 5/2002 | Smith et al. | |
| 6,394,695 B1 * | 5/2002 | Chausset | 403/397 |
| 6,402,188 B1 | 6/2002 | Pasch | |
| 6,431,585 B1 | 8/2002 | Rickabus et al. | |
| RE38,125 E | 5/2003 | Shibata et al. | |
| 6,565,116 B1 | 5/2003 | Tajima et al. | |
| 6,715,185 B2 | 4/2004 | Angellotti | |
| 7,338,068 B2 * | 3/2008 | Kawai et al. | 280/728.2 |
| 7,698,788 B2 * | 4/2010 | Hansen et al. | 24/297 |
| 2002/0125705 A1 | 9/2002 | Wong et al. | |
| 2003/0178832 A1 | 9/2003 | Dominissini et al. | |
| 2003/0222435 A1 | 12/2003 | Schmidt et al. | |

(Continued)

*Primary Examiner*—Robert J Sandy
(74) *Attorney, Agent, or Firm*—Harness, Dickey & Pierce, P.L.C.

(57) ABSTRACT

A fastener first member connects to a second member by a flexible tether. A third member having multiple deflectable wings slides onto the second member. A first member male pin extends through a third member aperture to engage second member biasing elements, joining the first, second and third members.

19 Claims, 11 Drawing Sheets

U.S. PATENT DOCUMENTS

2005/0285374 A1* 12/2005 Kawai et al. ............. 280/728.2
2005/0285375 A1* 12/2005 Kawai et al. ............. 280/728.2
2008/0235919 A1* 10/2008 Giddings et al. ............. 24/289

* cited by examiner

MULTIPLE ENGAGEMENT JOINT TETHERED FASTENER

CROSS-REFERENCE TO RELATED APPLICATIONS

This application is a divisional of U.S. patent application Ser. No. 11/656,904 filed on Jan. 23, 2007, presently allowed, which is a divisional of U.S. patent application Ser. No. 10/915,028 filed on Aug. 10, 2004, which issued as U.S. Pat. No. 7,178,205 on Feb. 20, 2007. The disclosures of the above applications are incorporated herein by reference.

FIELD

The present invention relates in general to clip type fasteners and more specifically to a device and methods for creating and using a clip type fastener assembly to join automobile vehicle component parts.

BACKGROUND

The statements in this section merely provide background information related to the present disclosure and may not constitute prior art.

For automotive applications, fasteners are used to join trim pieces to sections or metal body portions of the automobile. The requirements for these fasteners are that they be insertable into apertures of the automobile and meet requirements to both retain the trim piece as well as provide a minimum pullout retention force such that the trim piece can be removed to replace a damaged trim piece. In the event that an air bag has deployed which requires replacement of the air bag and/or the trim piece supporting the air bag, the fasteners need to be removable. Common fastener designs include directly opposed flexible wings which deflect inwardly upon insertion of the fastener and expand by spring force to hold the fastener within a rectangular slot in the automobile. These fasteners are typically intended to be at least semi-permanent. A drawback of commonly used fasteners is the lack of an accessible fastener joint to remove the fastener/trim piece for easy replacement following damage or an air bag deployment event.

Further drawbacks of existing designs include additional parts such as screws, malfunction problems between screws and metal, installation or removal labor required, beauty-cap requirements, lack of color match, a driver tool over-powering the metal/screw, high tooling cost, improper fitup causing loose components, and lack of ability to disengage from the trim when housing a full size air curtain.

SUMMARY

According to a preferred embodiment of the present invention, a fastener first member connects to a second member by a flexible tether. A third member having multiple deflectable wings slides onto the second member. A first member male pin extends through a third member aperture to engage second member biasing elements, joining the first, second and third members.

According to another aspect of the present invention, a fastener system includes first, second and third members. Each of the members when joined together connect a vehicle component part to a vehicle panel. The joined connections are distinguishable in a sequential order of connection strength such that the connections disconnect in the order of their connection strength.

According to still another aspect of the present invention, a method for fastening component parts of an automobile is provided. In yet another aspect of the present invention, a method for creating a multiple part clip fastener is provided.

A multiple engagement joint tethered fastener of the present invention offers several advantages. The features, functions, and advantages can be achieved independently in various aspects of the present invention or may be combined in yet other embodiments.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
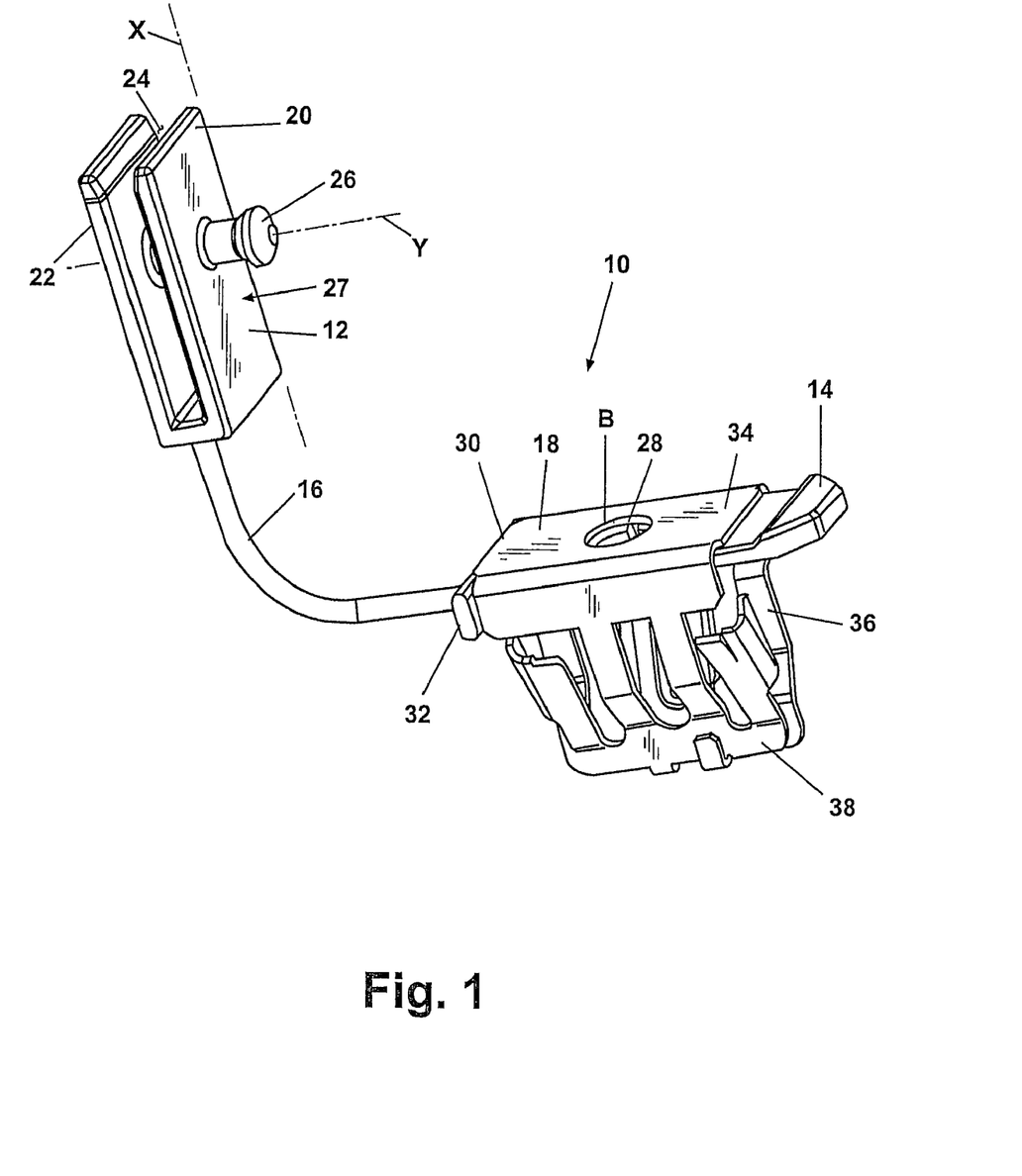
FIG. 1 is a perspective view of a partially assembled 3-way connecting tethered fastener according to a preferred embodiment of the present invention.

Referring generally to FIG. 1 and according to a preferred embodiment of the present invention, a three-way connecting tethered fastener of the present invention includes a fastener assembly 10 having a connector 12 joined to an engagement member 14 by a flexible element 16. A metal clip 18 is slidably engaged with engagement member 14 to pre-assemble fastener assembly 10.

Connector 12 is substantially U-shaped and includes a first planar portion 20 and a second planar portion 22. First and second planar portions 20 and 22 are arranged substantially parallel to each other and define a slot 24 between first planar portion 20 and second planar portion 22. A pin 26 defines a longitudinal axis "Y" which is oriented substantially perpendicular to a plane "X" defined by first face 27. Pin 26 is sized to be slidably received within an aperture 28 created in metal clip 18.

Metal clip 18 includes an abutment end 30 which engages a shoulder 32 of engagement member 14. Metal clip 18 further includes a mounting plate 34 through which aperture 28 is formed. Mounting plate 34 integrally includes each of a first contact side 36 and a second contact side 38. First and second contact sides 36 and 38 extend substantially transverse to mounting plate 34.

Figure 2:
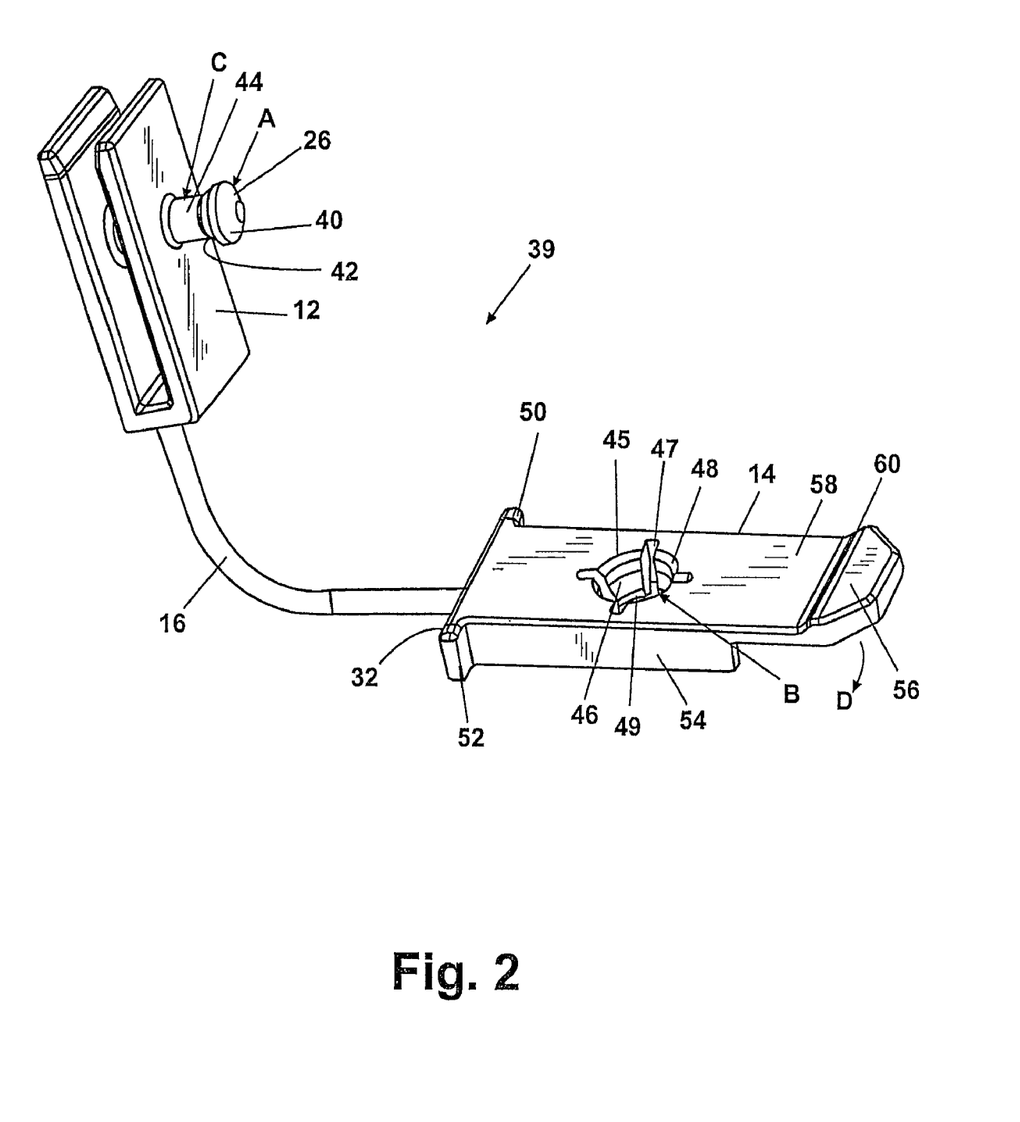
FIG. 2 is a perspective view of the tether-connected component parts of the fastener of FIG. 1.

Referring now to FIG. 2, an integrally connected sub-assembly 39 includes connector 12, engagement member 14 and flexible element 16. Pin 26 includes a bulbous head 40 having a head diameter "A". Head 40 is connected by a taper portion 42 to a stem 44. Stem 44 includes a stem diameter "C" which is smaller than head diameter "A". Head diameter "A" of pin 26 is sized to clear a head clearance diameter "B" of aperture 28 formed in metal clip 18 (shown in FIG. 1). Head diameter "A" of pin 26 is further sized to releasably engage within a stepped member 45 formed in engagement member 14. Stepped member 45 provides a major diameter equivalent to head clearance diameter "B" which provides diametrical clearance for head 40. Stepped member 45 also includes a plurality of stepped deflecting members 46 separated from one another by a plurality of channels 47. Each stepped deflecting member 46 includes a beveled contact surface 48 and an engagement surface 49. Head 40 of pin 26 elastically deflects each stepped deflecting member 46 as head 40 is inserted into stepped member 45. When head 40 extends beyond engagement surfaces 49, the elastic bias force of stepped deflecting members 46 direct engagement surfaces 49 into contact with taper portion 42 of stem 44 to releasably engage connector 12 to engagement member 14 through metal clip 18.

Engagement member 14 includes shoulder 32 at a first end having each of a first engagement shoulder 50 and a second engagement shoulder 52 transversely extending beyond each of a pair of side walls 54 (only 1 side wall 54 is visible in this view). A deflectable end 56 is positioned opposite to shoulder 32. Deflectable end 56 is connected to an extension member 58 by an inclined portion 60. Extension member 58 elastically deflects to allow deflectable end 56 to rotate about an arc "D" (a non-deflected condition of deflectable end 56 is shown). A primary purpose for inclined portion 60 is to engage mounting plate 34 of metal clip 18 (shown in FIG. 1) such that metal clip 18 is releasably retained between inclined portion 60 and shoulder 32.

Figure 3:
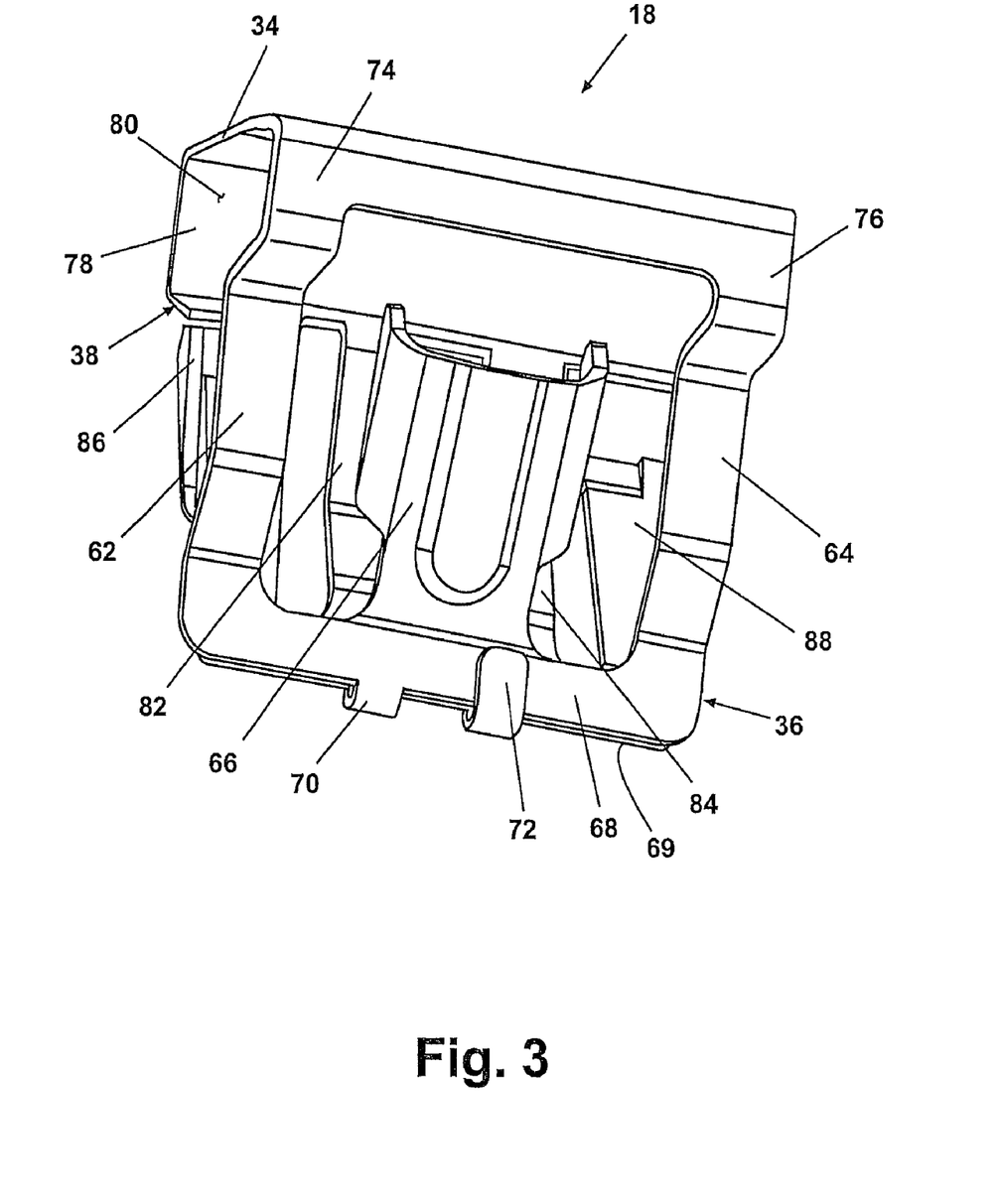
FIG. 3 is a perspective view of the metal clip portion of the fastener of FIG. 1.

As best seen in FIG. 3, first contact side 36 and second contact side 38 of metal clip 18 extend generally transversely from mounting plate 34. First contact side 36 includes a first exterior frame section 62, a second exterior frame section 64, and at least one first deflectable wing 66 integrally connectable to a cross member 68 distally extending from mounting plate 34. Cross member 68 is coupled to a cross member 69 of second contact side 38 by a first retaining tab 70 integrally formed with cross member 68 and a second retaining tab 72 integrally formed with cross member 69. Each of first retaining tab 70 and second retaining tab 72 are deformed such that they interlock as shown with the opposed cross member 68 or 69.

First exterior frame section 62 is integrally connected to mounting plate 34 by a first side wall 74. Similarly, second exterior frame section 64 is integrally connected to mounting plate 34 by a second side wall 76. First side wall 74 and second side wall 76 each oppose a third side wall 78 integrally connected to second contact side 38. A receiving channel 80 is defined between first side wall 74, second side wall 76, and third side wall 78. Receiving channel 80 is configured to slidably receive deflectable end 56 (shown in FIG. 2) of engagement member 14 when assembled as shown in FIG. 1. Second contact side 38 further includes a first interior frame section 82 and a second interior frame section 84 which are similar to first exterior frame section 62 and second exterior frame section 64. Second contact side 38 also includes at least two deflectable wings which are positioned opposite to first deflectable wing 66, including a second deflectable wing 86 and a third deflectable wing 88.

Figure 4:
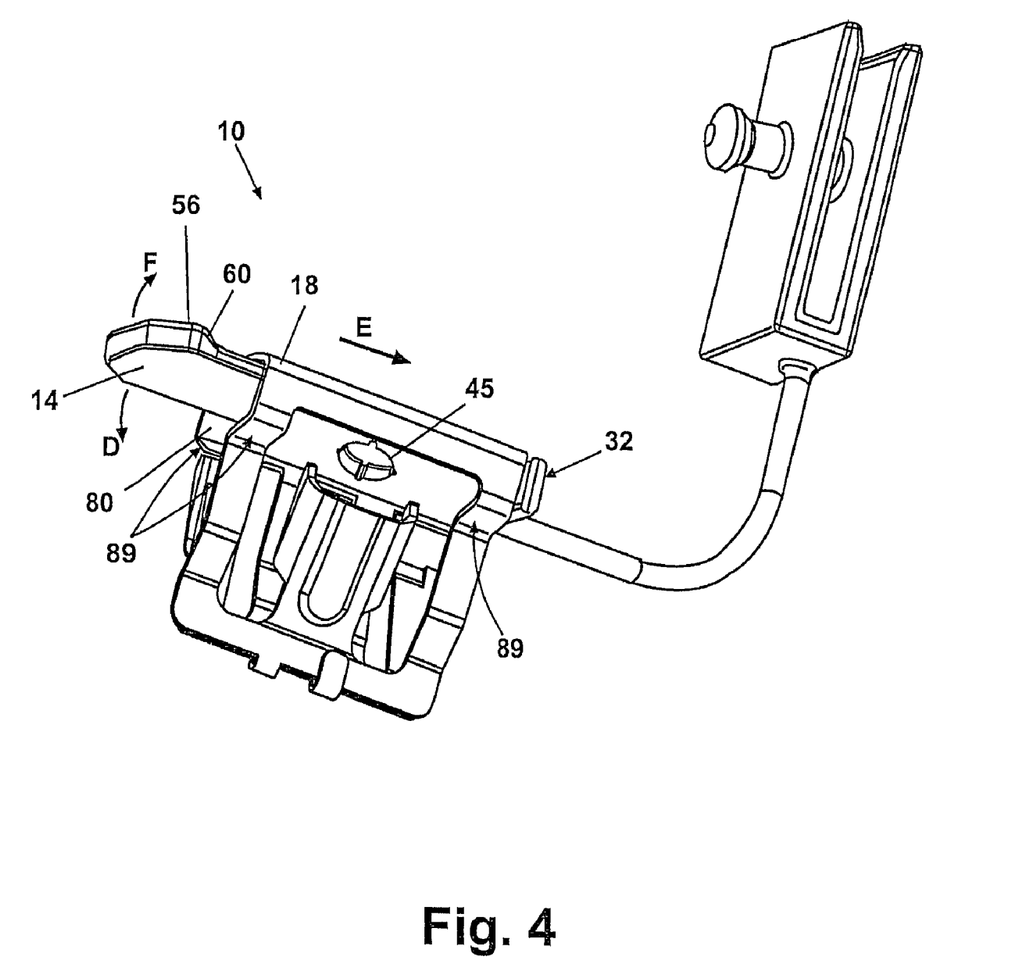
FIG. 4 is a perspective view of the fastener of FIG. 1 rotated to show the assembly of the metal clip portion.

Referring now to FIG. 4, metal clip 18 is slidably engaged with engagement member 14 of sub-assembly 39. This is accomplished by elastically deflecting deflectable end 56 of extension member 58 about arc "D" and sliding metal clip 18 over both deflectable end 56 and extension member 58 in an insertion direction "E" until metal clip 18 engages shoulder 32 of engagement member 14. Thereafter, deflectable end 56 of extension member 58 elastically springs back in a direction opposite to arc "D" such that engagement member 14 releasably restrains metal clip 18 between inclined portion 60 of deflectable end 56 and shoulder 32. Stepped member 45 is substantially coaxially aligned with aperture 28 at this time. A plurality of plate engagement members 89 are visible in this view.

Figure 5:
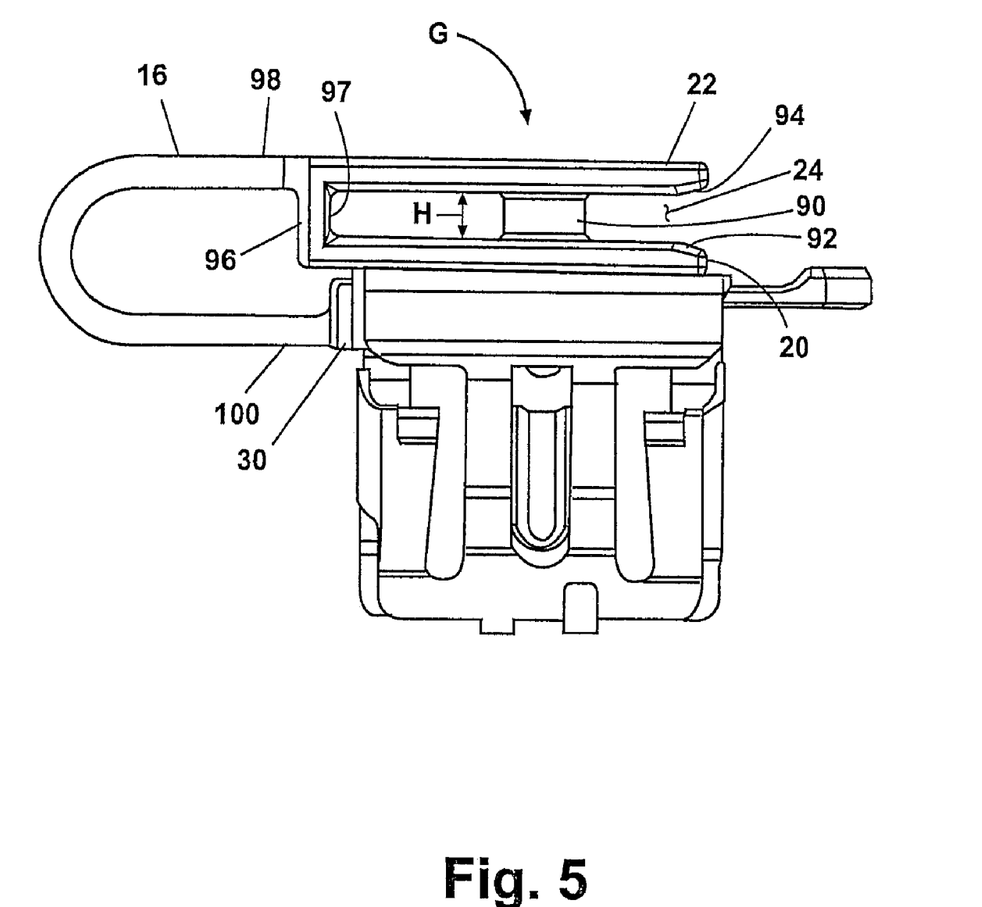
FIG. 5 is a side elevational view of an assembled fastener of the present invention in a 3-way connected condition.

As best seen in FIG. 5, each of the three main component parts of fastener assembly 10 of the present invention are shown in an assembled condition. Metal clip 18 is slidably engaged with engagement member 14 as described in reference to FIG. 4. Connector 12 is rotated in an assembly direction "G" such that pin 26 engages stepped member 45 (not clearly visible in this view). Further details of fastener assembly 10 are also visible in this view. A column 90 integrally joined between first planar portion 20 and second planar portion 22 maintains a standoff distance "H" for slot 24. A first beveled edge 92 and a second beveled edge 94 are provided for each of first planar portion 20 and second planar portion 22, respectively at an inlet of slot 24. First beveled edge 92 and second beveled edge 94 are provided to simplify alignment between slot 24 and a doghouse assembly (shown and described in reference to FIG. 6). A joining end 96 is also provided at a distal end of each of first planar portion 20 and second planar portion 22. Joining end 96 also provides an engagement face 97. Flexible element 16 is integrally joined to joining end 96 at a first end 98. Flexible element 16 is integrally joined to abutment end 30 of engagement member 14 at a second end 100.

Figure 6:
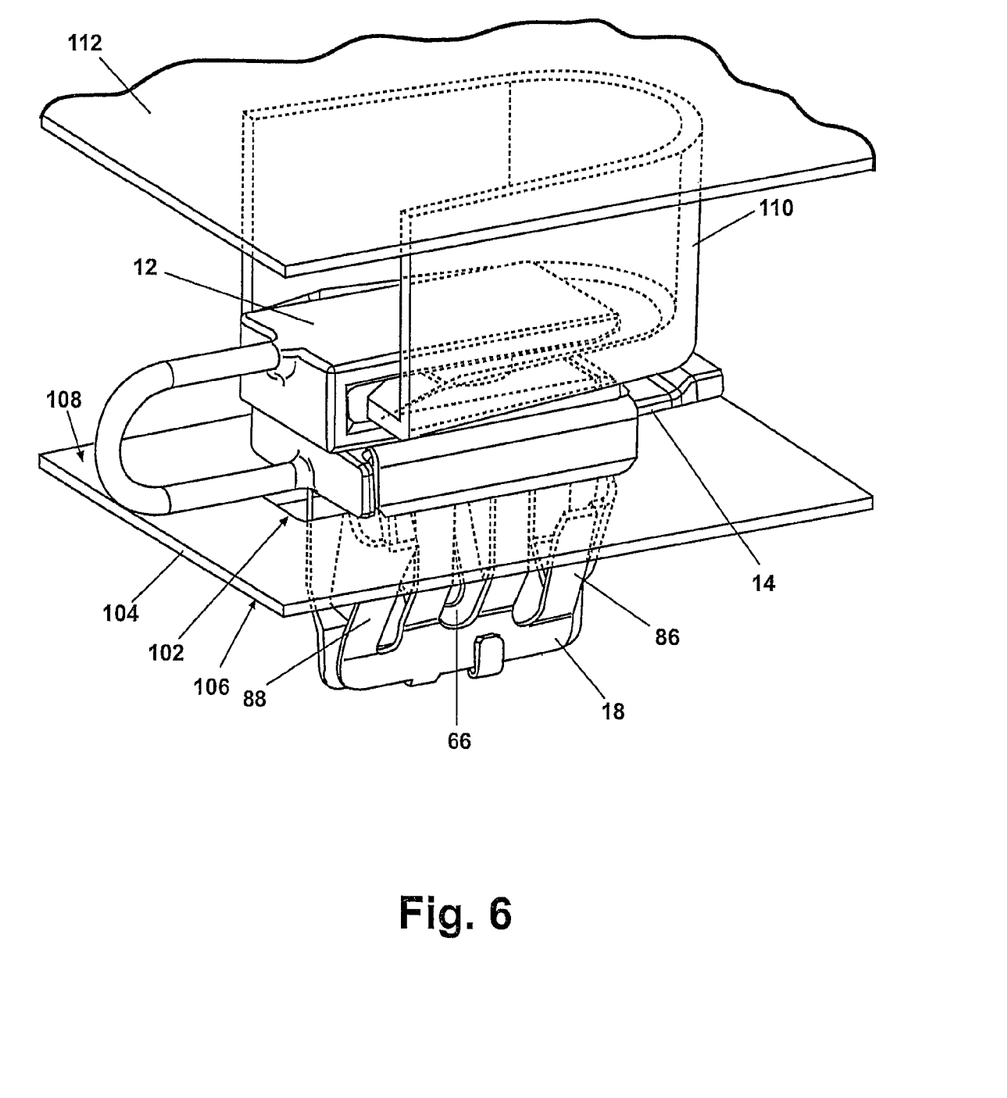
FIG. 6 is a perspective view of the assembled fastener of FIG. 5 when joining component parts of an automobile vehicle.

Referring generally to FIG. 6, a functionally joined fastener assembly 10 is described. Each of first contact side 36 and second contact side 38 of metal clip 18 are slidably inserted into an aperture 102 formed within a vehicle panel 104. Each of first deflectable wing 66, second deflectable wing 86 and third deflectable wing 88 deflect upon insertion into aperture 102 and elastically return to a non-deflected or expanded state following insertion. First deflectable wing 66, second deflectable wing 86, and third deflectable wing 88 engage a first surface 106 of panel 104, while the plurality of plate engagement members 89 (shown in FIG. 4) engage an opposed or second surface 108 of panel 104. A doghouse 110 is slidably received within slot 24 of connector 12. Doghouse 110 is matably connected to a component part 112 such as a trim piece for an automobile vehicle.

Figure 7:
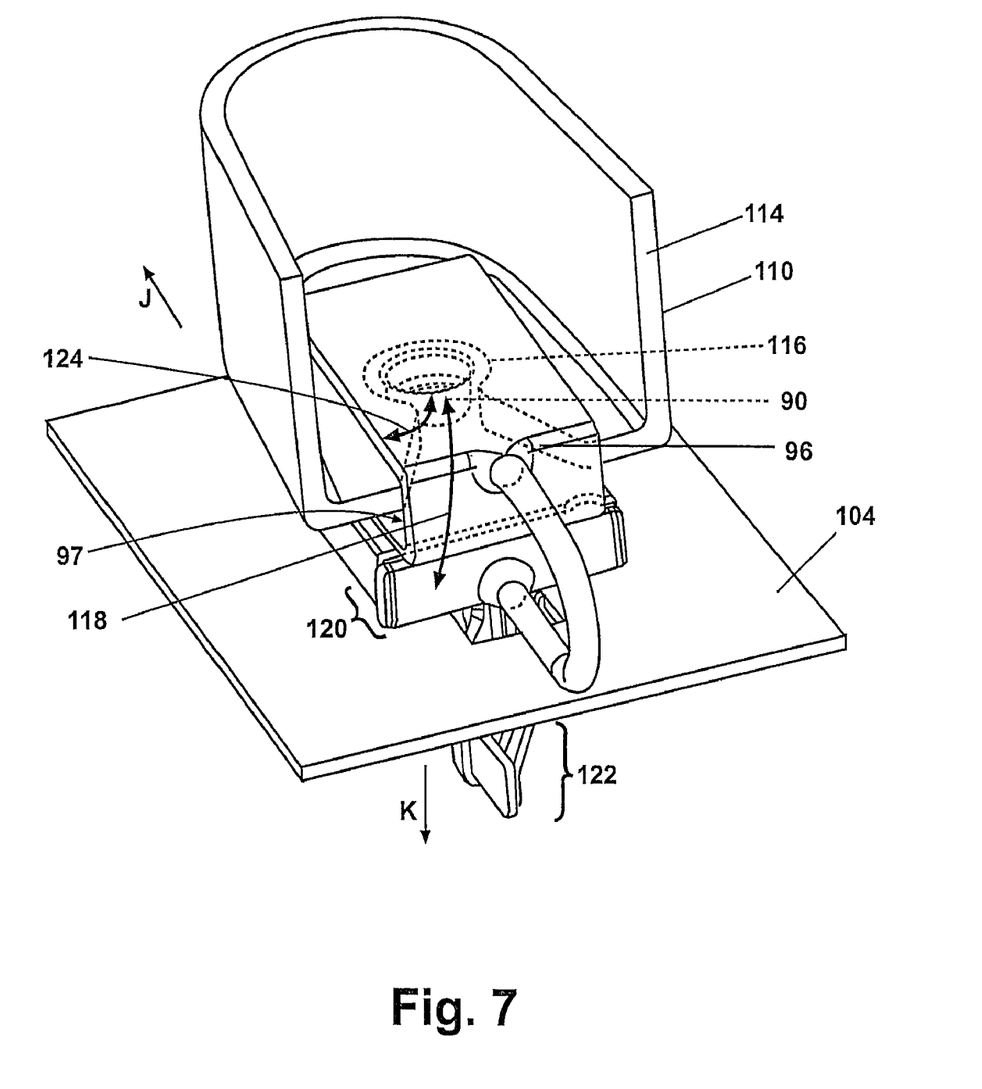
FIG. 7 is a rotated perspective view of the assembled fastener of FIG. 6.

Referring generally to FIG. 7, component part 112 has been removed for clarity. An engagement face 114 of doghouse 110 abuts engagement face 97 of connector 12. At the same time, column 90 is engaged with a key slot 116 formed in doghouse 110 by sliding connector 12 in an engagement direction "J" to engage doghouse 110.

Three primary releasable connections are formed when using fastener assembly 10 to join component part 112 to panel 104 of a vehicle. The releasable connections define a sequential or ascending order of joint integral strength. A first releasable connection 118 is formed between pin 26 and stepped member 45. A second releasable connection 120 is formed between metal clip 18 and engagement member 14. A third releasable connection 122 is formed by contact between first deflectable wing 66, second deflectable wing 86, and third deflectable wing 88 of metal clip 18 and panel 104. The retention strength of each of the releasable connections increases from first releasable connection 118 to the third releasable connection 122, wherein each successive releasable connection forms a stronger joint than the joint(s) preceding it. In other words, the first releasable connection intended to disengage or be disengaged in use is first releasable connection 118, followed successively by second releasable connection 120 and third releasable connection 122. One purpose for providing individual joining strengths for each of the releasable connections of the present invention is to allow, for example, a component part such as a trim panel to separate from a body panel of a vehicle in the event that an air bag associated with the trim panel deploys.

By designing first releasable connection 118 to separate first, flexible element 16 will continue to retain component part 112 via doghouse 110 to panel 104. Second releasable connection 120 is designed to release after first releasable connection 118 and allows complete separation of component part 112 and panel 104. Second releasable connection 120 is disconnected by either applying sufficient force in a direction opposite to insertion direction "E" or by manual deflection of extension member 58 which allows metal clip 18 to be slidably disengaged past both inclined portion 60 and deflectable end 56 of engagement member 14. The third releasable connection 122 is the strongest connection and is generally intended to be a permanent connection, because it may not be readily accessible after installation, and therefore requires manual deflection of the deflectable wings 66, 86, and 88 prior to removal of metal clip 18 from panel 104.

A fourth releasable connection 124 is also formed between column 90 and key slot 116 of doghouse 110. Fourth releasable connection 124 physically joins doghouse 110 to connector 12. This releasable connection is designed to release within the sequential order after first releasable connection 118 and before second releasable connection 120 to allow repair or replacement of the trim panel.

Figure 8:
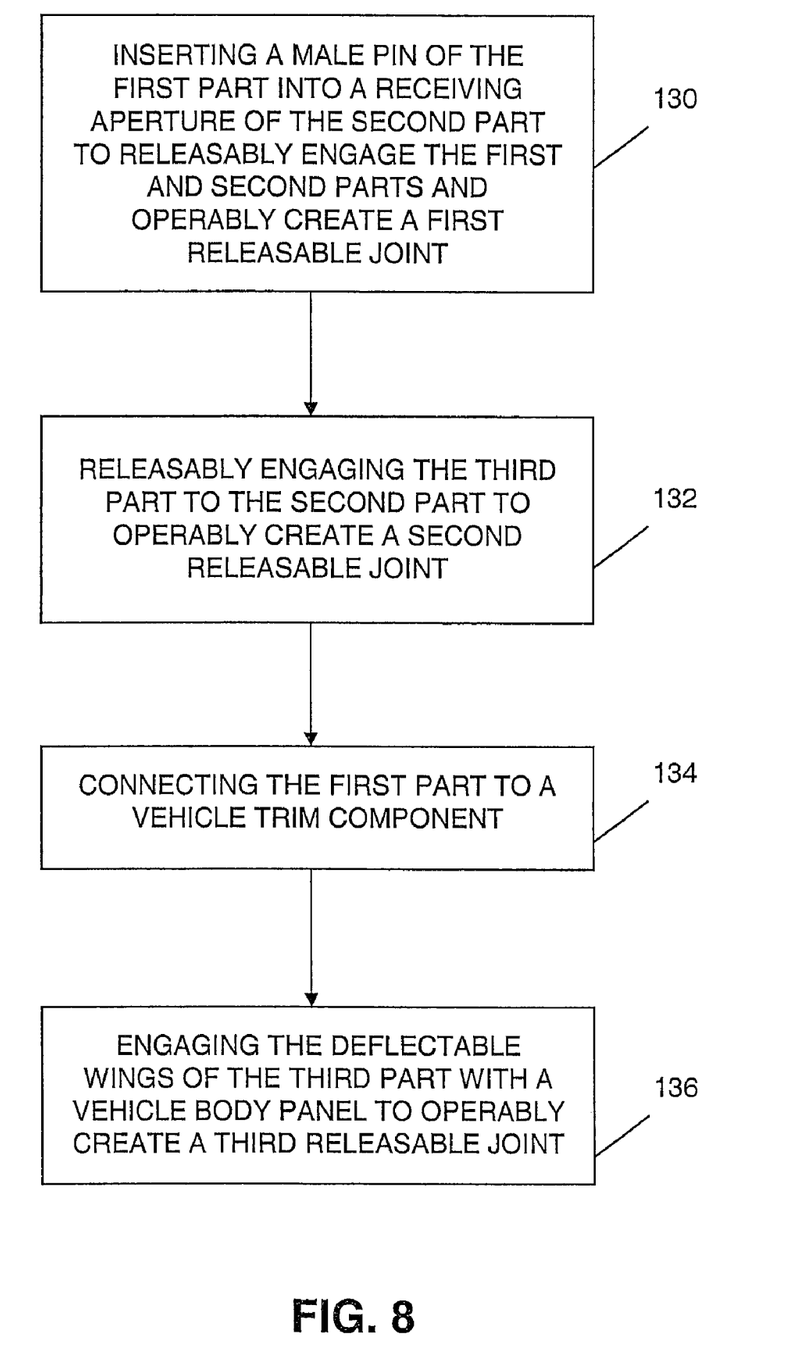
FIG. 8 is a flow diagram of the steps for fastening component parts of an automobile assembly using a multiple engagement joint tethered fastener of the present invention.

Referring to FIG. 8, in a step 130, a male pin of the first part is inserted into a receiving aperture of the second part to releasably engage the first and second parts and operably create a first releasable joint. In a step 132, the third part is releasably engaged to the second part to operably create a second releasable joint. In a step 134, the first part is connected to a vehicle trim component. In a step 136, the deflectable wings of the third part are engaged with a vehicle body panel to operably create a third releasable joint. Each of the first, second and third releasable joints are releasable in a sequential order including the first releasable joint, the second releasable joint, and the third releasable joint.

Figure 9:
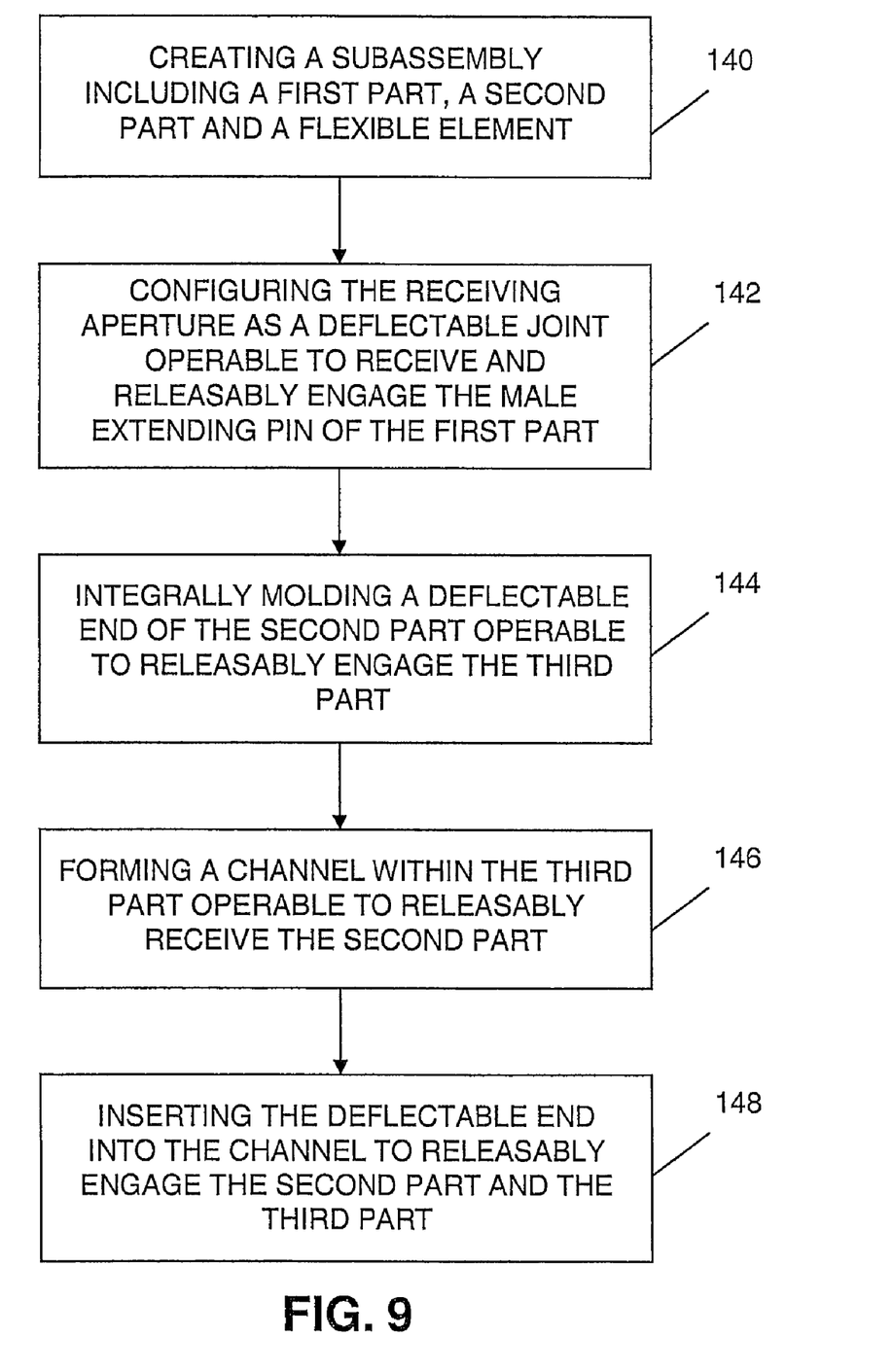
FIG. 9 is a flow diagram of the steps for creating a multiple engagement joint tethered fastener of the present invention.

Referring generally to FIG. 9, in a step 140 a subassembly including a first part, a second part and a flexible element is created. In a step 142, the receiving aperture is configured as a deflectable joint operable to receive and releasably engage a male extending pin of the first part. In a step 144, a deflectable end of the second part operable to releasably engage the third part is integrally molded with the second part. In a step 146, a channel is formed within the third part operable to releasably receive the second part. At a step 148, the deflectable end is inserted into the channel to releasably engage the second part and the third part.

Figure 10:
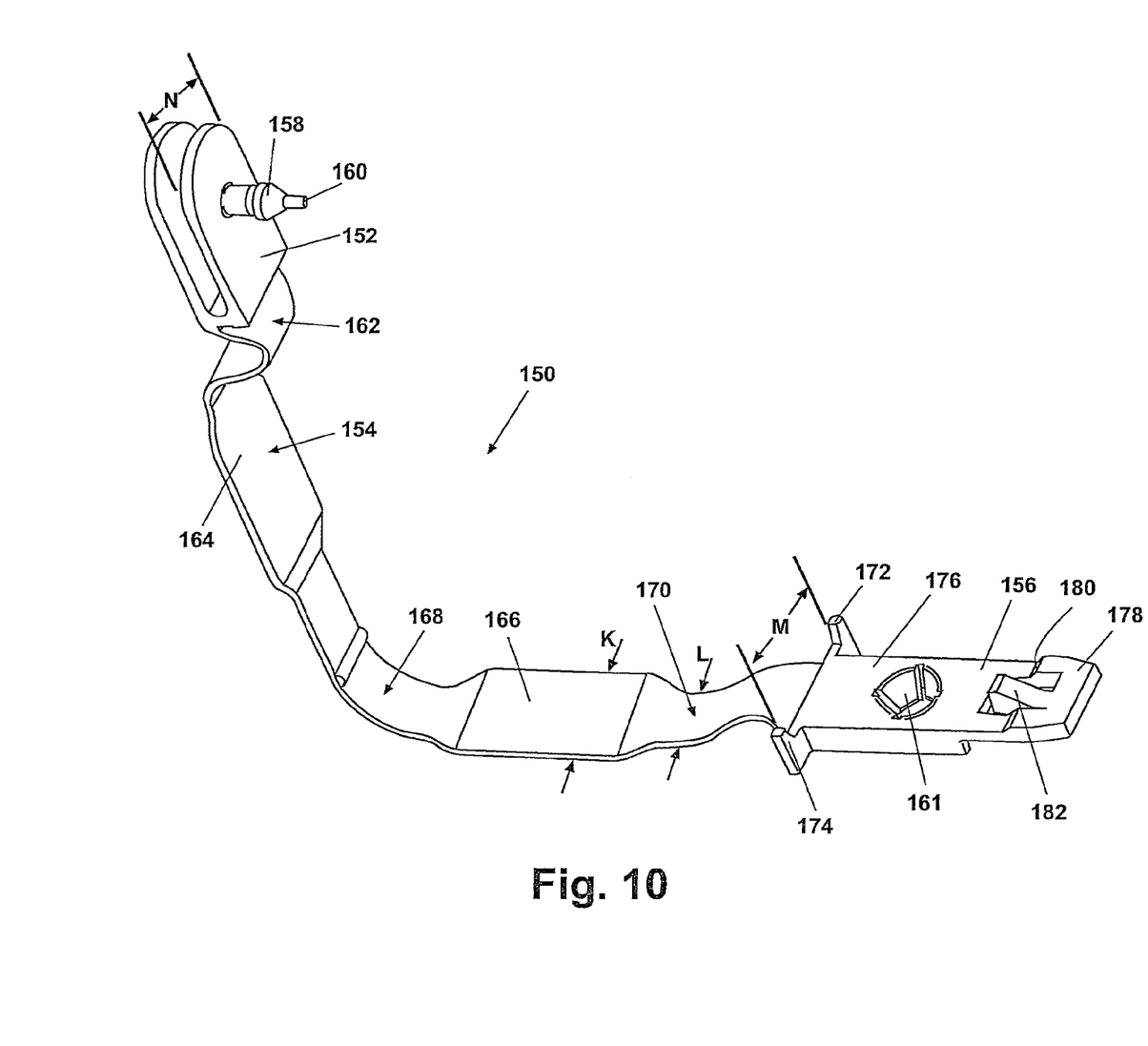
FIG. 10 is a perspective view of another preferred embodiment of the present invention having tether-connected component parts of the fastener.

As best seen in FIG. 10, in another preferred embodiment of the present invention an integrally connected sub-assembly 150 is modified from integrally connected sub-assembly 39 of FIG. 2. Only the differences between sub-assembly 150 and sub-assembly 39 will therefore be discussed. Sub-assembly 150 includes a connector 152 integrally connected by a strap 154 (acting as a tether) to an engagement member 156. Connector 152 includes a pin 158 modified from pin 26 to also include a lead-in member 160. Connector 152 is integrally connected to strap 154 using one or more flexible elements 162. Strap 154 also includes a plurality of wide and narrow sections, shown for example in FIG. 10 as a first major width section 164, a second major width section 166, a first minor width section 168 and a second minor width section 170. The major width sections 164,166 have a strap major width "K" and the minor width sections 168,170 have a strap minor width "L" wherein "K">"L".

Strap 154 is integrally connected to engagement member 156 at an intersection defining a first post 172 and a second post 174. A post clearance width "M" receives connector 152, which includes a connector width "N" sized to mate within post clearance width "M". First and second posts 172, 174 provide an anti-rotational feature to prevent connector 152 from rotating with respect to engagement member 156 when pin 158 is received within a stepped member 161 of engagement member 156. Stepped member 161 is otherwise similar to stepped member 45. An exemplary purpose for lead-in member 160 of pin 158 is to improve alignment of pin 158 with stepped member 161 such that connector 152 aligns between first and second posts 172,174 respectively. Engagement member 156 also provides an engagement section 176, a deflectable end 178 connected to engagement section 176 by an inclined junction 180, and a deflectable tab 182.

Figure 11:
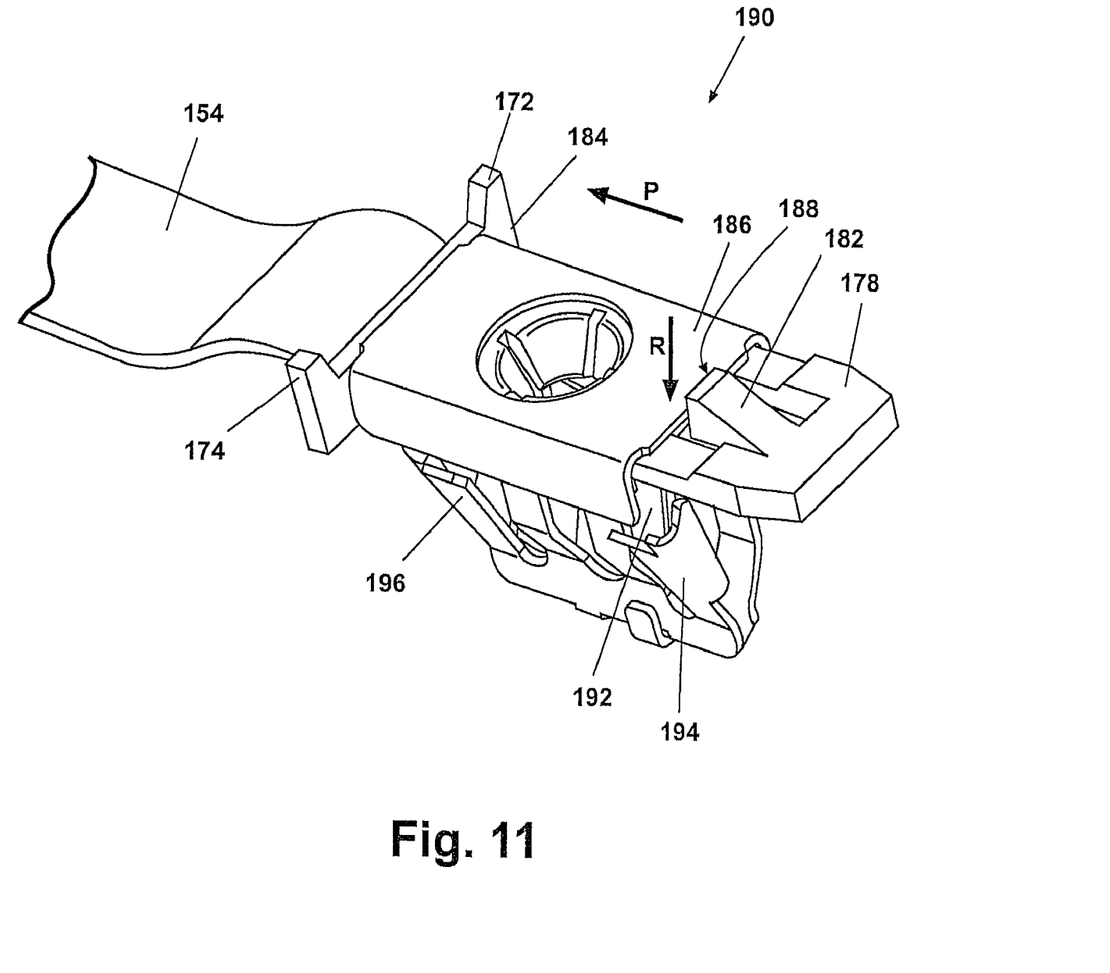
FIG. 11 is a perspective view of an assembly of components of the embodiment of FIG. 10.

Referring finally to FIG. 11, an engagement face 184 defined by first and second posts 172,174 acts as a stop for a clip member 186 (similar to metal clip 18). Clip member 186 is slidably mated with engagement member 156 by sliding in a sliding direction "P". Both deflectable end 178 and deflectable tab 182 are elastically deflected in a deflection direction "R" allowing clip member 186 to reach the installed position shown in FIG. 11. Both deflectable end 178 and deflectable tab 182 spring back by elastic force such that clip member 186 is retained between a tab face 188 of deflectable tab 182 and engagement face 184. Thereafter, deflectable tab 182 must be deflected in the deflection direction "R" to remove clip member 186. Deflectable tab 182 therefore provides an increased retention capability compared to the embodiment shown in FIG. 1.

The shape of strap 154 and the mating features of sub-assembly 150 limit the amount of relative twisting between connector 152 and engagement member 156 compared to the embodiment of FIG. 1, which in the example shown uses a relatively circular-shaped flexible element 16 as a tether. Other shapes can be used for either strap 154 or flexible element 16, including but not limited to polygonal, rectangular, square, oval, continuous width, etc. The invention is not limited by the shape of either strap 154 or flexible element 16 shown. Materials for sub-assembly 150 and clip member 186 are similar to materials for fastener assembly 10. Clip member 186 can also be manufactured of a composite or polymeric material providing the material used retains the hierarchy of joint strength of fastener assembly 190.

Similar to fastener assembly 10, a fastener assembly 190 including connector 152, engagement member 156 and clip member 186 provides a hierarchy of joint strengths. A relative joint strength in ascending order of fastener assembly 190 includes a first joint created between pin 158 of connector 152 and stepped member 161 of engagement member 156. A second joint is created when clip member 186 is received between engagement face 184 and tab face 188. A third joint is created between a plurality of deflectable wings 192, 194 and 196 of clip member 186 and a panel of a vehicle, such as panel 104 shown in FIG. 6.

A fastener assembly of the present invention offers several advantages. By providing multiple releasable connections, each having an individual joint strength which can be configured in ascending or sequential order, events such as an airbag deployment can be accommodated while preventing component parts such as trim panels from completely separating from the vehicle body panel. Further release in a selected order of the releasable connections permits part disassembly, repair or replacement of a part, or complete disassembly of the fastener assembly.

Further areas of applicability will become apparent from the description provided herein. It should be understood that the description and specific examples are intended for purposes of illustration only and are not intended to limit the scope of the present disclosure. For example, as few as two opposed deflectable wings can be used, or a greater number than three deflectable wings can be used. Flexible element 16 can be created as a separate part and connected between connector 12 and engagement member 14, which allows connector 12 and engagement member 14 to be separately created and/or made using different materials to differentiate the releasable connection strength(s). Metal clip 18 can be replaced by a composite or polymeric material part. Such variations are not to be regarded as a departure from the spirit and scope of the invention.

What is claimed is:

1. A fastener system, comprising:
    a first member having first and second planar portions connected at a joining end, the first planar portion further having a male pin member extending substantially transversely therefrom;
    a second member having a receiving aperture and at least one biasing element adapted to releasably engage the male pin;
    a column extending from at least one of the first and second planar-portions, the column creating a standoff distance between the first and second members;
    a flexible element integrally connecting the second member to the first member, the flexible element operating to allow the male pin to be co-axially aligned with and inserted into the receiving aperture; and
    the male pin being displaceable into the receiving aperture to engage the at least one biasing element in a fastener engaged position to releasably connect the first and second members.

2. The fastener system of claim 1, wherein the male pin further comprises:
    a stem; and
    an extending member connected to the stem;
    wherein the extending member operates to elastically displace the biasing element during insertion of the male pin into the receiving aperture, the biasing element elastically deflecting to releasably retain the male pin in the receiving aperture.

3. The fastener system of claim 1, wherein each of the first member, the second member, and the flexible element comprise a single polymeric material.

4. The fastener system of claim 3, wherein the polymeric material comprises a polyamide material.

5. The fastener system of claim 1, comprising an integrally connected subassembly including the first member, the second member and the flexible element created as a single molded part.

6. The fastener system of claim 1, wherein the male pin further comprises a lead-in portion operating to align the male pin with the receiving aperture.

7. A fastener system, comprising:
    a fastener, including:
        a substantially U-shaped first member including opposed first and second planar portions connected by a joining end, the first planar portion having a transversely extending male pin;
        a second member homogeneously connected to the first member, the second member having a receiving aperture and at least one biasing element adapted to releasably engage the male pin;
        a column extending from at least one of the first and second planar portions, the column creating a standoff space between the first and second members; and
    a vehicle component received within the standoff space between the first and second planar portions and releasably engaged with the column.

8. The fastener of claim 7, further comprising:
    a flexible tether homogeneously connecting the second member to the first member to permit the male pin of the first member to align with the receiving aperture of the second member;
    wherein the first and second members and the flexible element are a co-molding created from a polymeric material.

9. The fastener of claim 7, further comprising an extending member having flexible wings connected to the second member.

10. The fastener system of claim 9, further including a vehicle panel having an aperture, the extending member and the flexible wings received in the aperture of the vehicle panel, the flexible wings being elastically deflectable when inserted into the aperture, and outwardly biased to releasably engage the second member to the vehicle panel.

11. A fastener system, comprising:
    a fastener, including:
        a first member including opposed first and second planar portions connected by a joining end, the first planar portion having a transversely extending male pin;
        a column extending from at least one of the first and second planar portions, the column creating a standoff space between the first and second members;
        a second member homogeneously connected to the first member, the second member having a receiving aperture adapted to releasably engage the male pin;
        a flexible tether homogeneously connecting the second member to the first member, the first and second members and the flexible element tether being a co-molding created from a polymeric material; and
    a vehicle component received within the standoff space between the first and second planar portions and releasably engaged with the column.

12. The system of claim 11, further including a plurality of connections created by the fastener and between the fastener and the vehicle component, including:
    a first connection created between the male pin and the receiving aperture of the second member, the first connection defining a first retention strength; and
    a second connection created between the vehicle component and column upon insertion of the vehicle component between the first and second members, the second connection defining a second retention strength greater than the first retention strength.

13. The system of claim 12, wherein the first and second connections are releasable in an ascending order defining in sequence the first connection and the second connection.

14. The system of claim 11, wherein the male pin further comprises a deflecting member biased to engage the second member when received in the receiving aperture.

15. The system of claim 11, wherein the vehicle component includes a doghouse having a flat wall of the doghouse including an aperture to receive and releasably engage the column.

16. The system of claim 11, wherein the pin is aligned on a pin axis extending substantially transverse to a plane of the first planar portion.

17. A fastener system, comprising:
a fastener, including:
a first member including opposed first and second planar portions connected by a joining end, the first planar portion having a transversely extending male pin;
a column extending from at least one of the first and second planar portions spatially separated from the joining end, the column creating a standoff space between the first and second members;
a second member homogeneously connected to the first member, the second member having a receiving aperture and at least one biasing element adapted to releasably engage the male pin;
an extending member having flexible wings connected to the second member; and
a vehicle component received within the standoff space between the first and second planar portions and releasably engaged with the column.

18. The fastener system of claim 17, further including a vehicle panel having an aperture, the extending member and the flexible wings received in the aperture of the vehicle panel, the flexible wings being elastically deflectable when inserted into the aperture, and outwardly biased to releasably engage the second member to the vehicle panel.

19. A fastener system, comprising:
a fastener, including:
a first member including a body having first and second portions, and a male member;
a second member;
a column and a joining end connecting the first and second planar portions, the column creating a standoff space between the first and second members;
a flexible tether homogeneously connecting the second member to the first member, the first and second members and the flexible tether being a co-molding created from a polymeric material;
an extending member having flexible wings connected to the second member;
a vehicle panel having an aperture, the extending member and the flexible wings received in the aperture of the vehicle panel, the flexible wings being elastically deflectable when inserted into the aperture and outwardly biased to releasably engage the second member to the vehicle panel; and
a vehicle component including an extending structure having an aperture sized to receive and engage the male member of the first member, the fastener operating to releasably connect the vehicle component and the vehicle panel.

* * * * *